April 10, 1951     H. H. STAUB     2,548,449
SENSITIVITY MODULATOR
Filed Aug. 29, 1945     2 Sheets-Sheet 1

WITNESSES
INVENTOR.
Hans H. Staub
BY

April 10, 1951  H. H. STAUB  2,548,449
SENSITIVITY MODULATOR
Filed Aug. 29, 1945  2 Sheets-Sheet 2

WITNESSES
Ralph G. Miller
Ralph Carlisle Smith

INVENTOR.
Hans H. Staub
BY
Robert A. Lavender

Patented Apr. 10, 1951

2,548,449

UNITED STATES PATENT OFFICE 2,548,449

SENSITIVITY MODULATOR

Hans H. Staub, Palo Alto, Calif., assignor to the United States of America as represented by the United States Atomic Energy Commission Application August 29, 1945, Serial No. 613,399

7 Claims. (Cl. 250—83.6)

This invention relates to an electronic recorder circuit.

More particularly the invention relates to electronic apparatus for measuring the energy spectrum of fission neutrons including a modulated feed-back amplifier.

A convenient method of obtaining fission neutrons for study comprises employing a cyclotron to produce a burst of primary neutrons by a deuteron-beryllium reaction, and causing the primary neutrons so produced to induce atomic fission of a suitable material with resulting emission of fission neutrons. Neutron detection may be accomplished by indicating, for example, ionization due to recoil protons in a hydrogen filled ionization chamber, the output of which is fed to a linear amplifier for actuation of a suitable indicating device such as a differential counter or an oscilloscope.

Difficulties are encountered when it is desired to detect fission neutrons alone, since it is necessary to distinguish between the effects of the primary neutrons and of the fission neutrons. The usual method of discriminating between primary and fission neutrons has been to modulate an amplifier connected in circuit between the ionization chamber and the indicating device in a manner to hold the amplifier insensitive at the time of the primary burst and until such time as the effects of this burst have become negligible. This method has the disadvantage that the intensity of fission neutrons has become quite low by the time the effects of the primary burst have decayed, resulting in poor statistics. Another objection to the above method resides in the fact that in electronic circuits heretofore known, modulation of an amplifier in a manner to obtain time control of the sensitivity thereof has been effected at the expense of introducing an undesired signal in the output, due to the modulating signal.

It is therefore a primary object of the invention to provide electronic apparatus which permits measuring the energy spectrum of fission neutrons produced in the above stated manner, with minimum time delay between the primary neutron burst and start of the measuring cycle.

Another object of the invention is to provide an amplifier with means for accurately controlling periods of operativeness in respect to periods of inoperativeness.

A further object of the invention is to provide an electronic amplifier wherein the time sensitivity is controlled without introducing spurious signals in the output thereof due to the controlling signal.

Still another object is to provide an improved feed-back amplifier, the sensitivity of which is adapted to be modulated in response to an introduced signal.

Other objects and advantages of the present invention will become apparent to persons skilled in the art upon examination of the following description and appended drawings forming a part of this specification.

In the drawings, in which like parts are designated by the same reference characters:

Briefly, the manner in which the invention accomplished the above objects is as follows. A pulsed source of primary neutrons is obtained in conventional manner from a pulsed cyclotron (cf C. P. Baker and R. F. Bacher, Physical Review, vol. 59, p. 332: 1941), the primary neutrons after having been slowed to thermal energies by passing through a paraffin channel are introduced into a hollow container of the type disclosed by Felix Bloch, in his copending U. S. patent application Serial Number 618,357 filed September 24, 1945 now abandoned. Thermal neutrons in the container impinge on a sample of fissionable material, fission neutrons being then emitted. A hydrogen-filled ionization chamber is suspended within the container and connected to a linear amplifier to amplify the pulses due to recoil protons produced by neutrons in the chamber. Differentation between primary and fission neutrons is accomplished in the following manner: A non-passive feed-back circuit is associated with an electronic amplifier to produce complete degenerative feed-back therein. An auxiliary circuit, synchronized with the cyclotron pulse, generates a square wave which renders and maintains the feed-back circuit inoperative during periods starting at a predetermined time after one cyclotron pulse and ending just prior to initiation of a succeeding pulse. The output of the amplifier thus controlled is fed to two counting circuits, one of which indicates all counts above a certain energy level, the other, all counts within a certain energy range.

Figure 1:
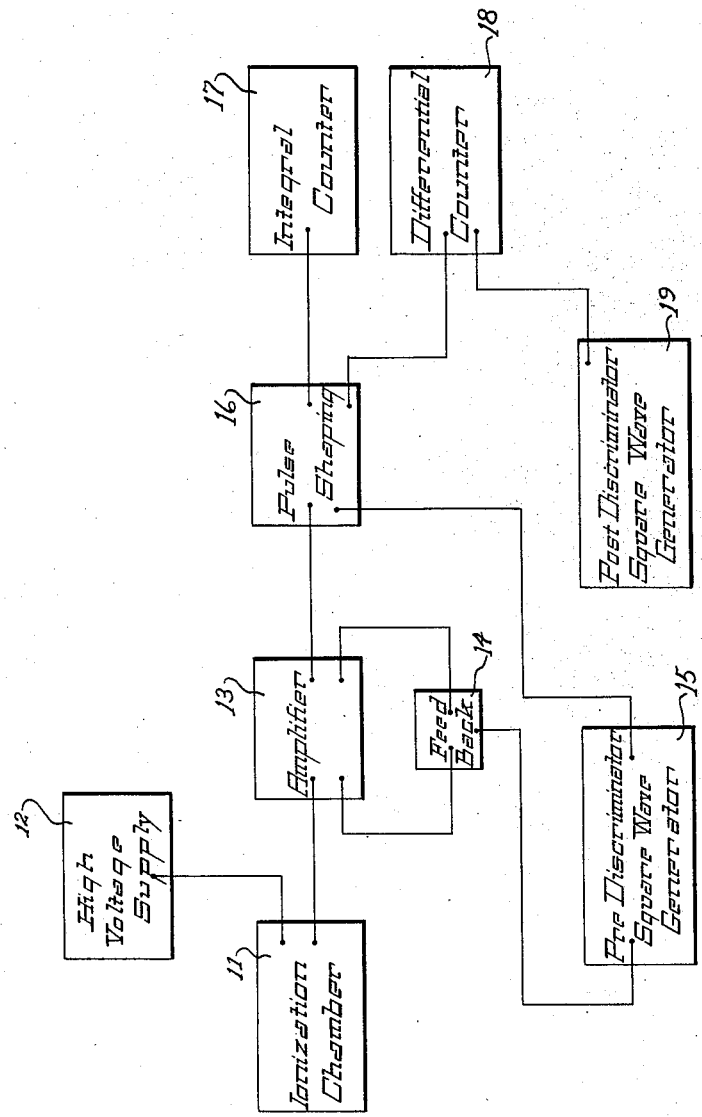
Figure 1 is a block diagram of the detecting apparatus.

Operation of the various circuits comprising the invention may be more fully understood by referring to Figure 1, in which ionization chamber 11 is furnished with operating potential from high voltage supply 12, the chamber output being fed to amplifier 13. Feed-back circuit 14 is connected between the output and input of amplifier 13 to obtain complete degenerative feed-back for a period of time determined by pre-discriminator square wave generator 15, which is connected to feed-back cricuit 14. The output of amplifier 13 is fed to pulse-shaping circuit 16, operation of which is also controlled by generator 15. The output of circuit 16 in turn operates integral counter 17 and differential counter 18, the latter being controlled by post-discriminator square wave generator 19.

The square wave generator circuits 15 and 19, may be connected in a manner not shown to insure synchronization of output signals. In particular, these circuits have been associated with other circuits, not shown, which control a cyclotron in a manner to give a pulsed output which is synchronized with respect to the operation of the circuits indicated in Figure 1, in the present device, for example, the synchronizing signal being the commercial sixty cycle voltage used to supply the power required by the various circuits.

Figure 2:
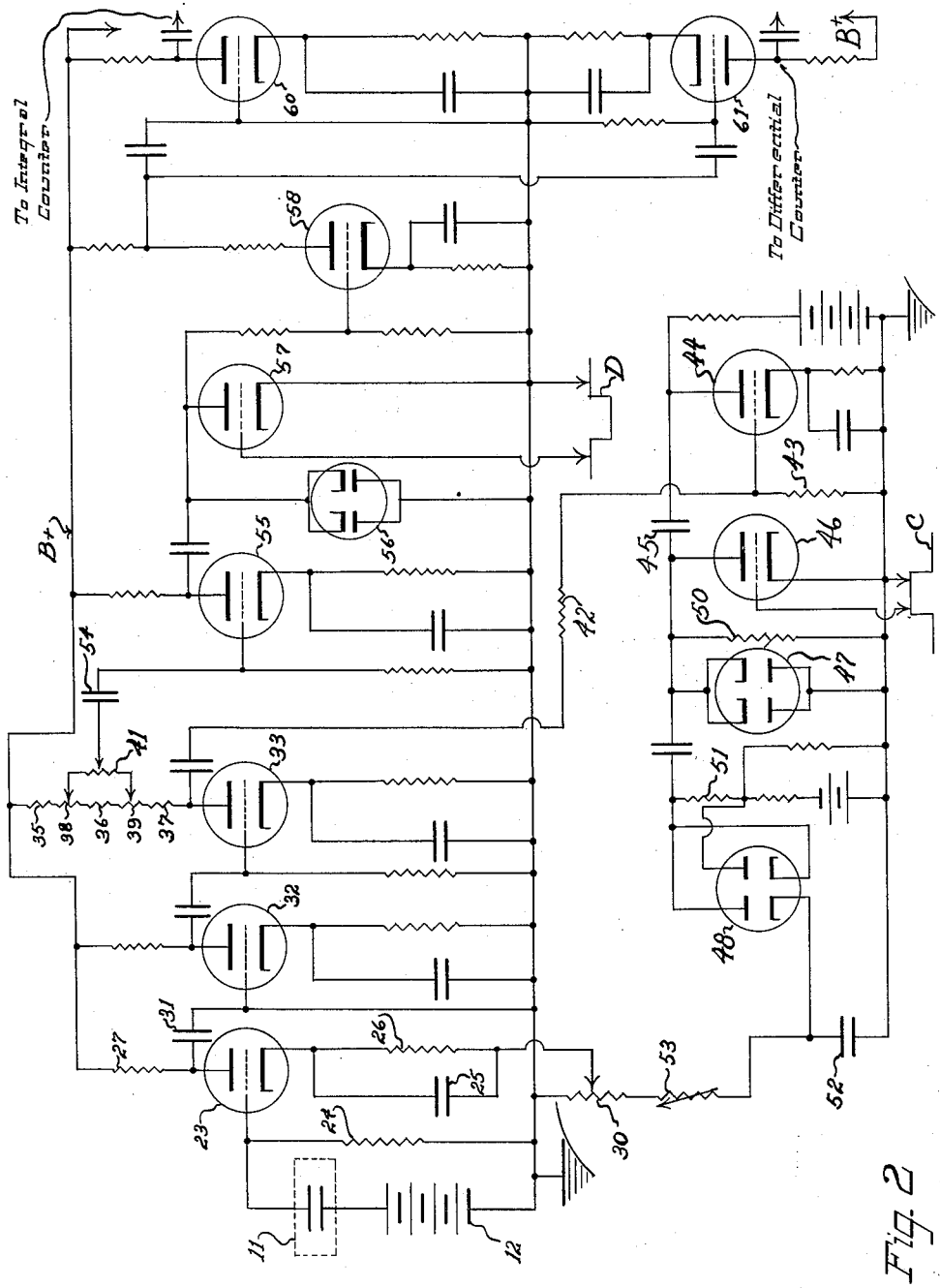
Figure 2 is a schematic diagram of the amplifier and feed-back circuits.

The manner in which the circuits of Figure 1 cooperate to effect the desired result may be understood upon examination of Figure 2, in which ionization chamber 11 is represented schematically as a capacitor, one plate of which is maintained at a high positive potential with respect to ground by high voltage supply 12, represented for convenience as a battery, although any suitable rectified alternating current supply may be used. The collecting electrode of ionization chamber 11, as represented by the other plate of the capacitor, is connected directly to the control grid of vacuum tube 23 for the introduction of a signal thereon.

For simplification of the schematic circuit diagram, all electron tubes other than diodes are illustrated as being of the triode type, it being well understood that other types such as pentodes may be employed. Since, however, all electron tubes other than diodes used in the present invention comprise at least a cathode, anode, and control grid, the diagrams have been simplified by the omission of conventional circuit elements and connections attendant upon the use of pentode type tubes. Certain polarizing voltage sources have been omitted, as well as sources of potential for energizing the heaters associated with the thermionic cathodes of the various tubes, it being conventional practice in the electronic art thus to simplify a schematic diagram.

Referring to tube 23, Figure 2, associated circuit elements include a conventional grid leak resistor 24, cathode by-pass capacitor 25, cathode bias resistor 26, and plate load resistor 27. For the purpose of introducing degenerative feedback in tube 23 bias resistor 26 is returned to the variable tap of a potentiometer 30, instead of to ground. From the anode of tube 23 the signal is fed through blocking capacitor 31 to the control grid of tube 32. Tube 32 in cooperation with its associated elements provides a second stage of amplification, the output of which is fed to the control grid of tube 33 which provides a third stage of amplification, the amplification of this stage being variable through the provision of a plate load comprising resistors 35, 36, and 37 in series with potentiometers 38 and 39 as shown, and potentiometer 41 in shunt across a portion of potentiometer 38, resistor 36, and a portion of potentiometer 39.

A fixed portion of the output of amplifier tube 33, determined by the ratio of resistors 42 and 43, is fed to the control grid of tube 44 which functions as an amplifier, the output thereof being fed through blocking capacitor 45 to a discriminator and pulse shaping network comprising tubes 46, 47, and 48 together with associated circuit elements. Tube 46 operates in a known manner as a clamp tube, i. e., it short-circuits the signal voltage output of tube 44 when its control grid voltage is such as to allow appreciable conduction therein, and constitutes a high impedance to the signal voltage when biased to cut-off or below. Tube 47 acts as a diode limiter to suppress negative voltage peaks appearing between the plate of tube 46 and ground, resistor 50 providing a D. C. path therebetween.

One-half of duo-diode tube 48 provides further clipping of negative pulses developed across resistor 51, while the other half conducts on positive peaks to charge capacitor 52, the charge thus accumulated leaking off through a portion of rheostat 53 and potentiometer 30, thus changing the cathode bias of tube 23. Since the large positive pulse produced in the chamber by the burst of primary neutrons and introduced on the grid of amplifier tube 23 obviously will have a D. C. component, and since the amplifier and feed-back circuits amplify only A. C. components, non-linear distortion of the pulse fed back to the cathode of tube 23 must be introduced in order to render the feed-back effective in cancelling the pulse due to primary neutrons. This is accomplished by adjusting the resistance value of rheostat 53 in respect to the value of capacitor 52 and potentiometer 30 to match the time constant of the feed-back pulse with that of the original pulse.

By suitable choice of components the feed-back circuit comprising tubes 44, 46, 47, and 48 and associated circuit elements effectively neutralizes signals arising in ionization chamber 11 except during the time the feed-back signal is short-circuited by clamp tube 46, which time is controlled by square waves illustrated by reference character C fed to the control grid of tube 46 by generator 15.

The theory upon which the above operations is based is an extension of the conventional theory of feed-back amplifiers, a brief treatment of which is as follows. If A is the amplification of an amplifier in which no feed-back is employed, and $\beta$ is the factor by which the output voltage of such an amplifier is multiplied to determine the voltage fed back to the input when feed-back is employed, then $$G = \frac{A}{1 - \beta A}$$

where G is the gain of the system including the effects of feed-back.

If the feed-back is degenerative then the sign of $\beta$ is negative and G is always less than A. In particular if $\beta A$ is large compared to unity a useful approximation is:

$$G \approx \frac{1}{\beta}$$

For passive feed-back networks $\beta$ may have values between zero and unity; correspondingly under the above assumption the lower limit for the value of G is unity. An "amplification" of unity corresponds to an output voltage just equal to the input voltage. The present invention employs a non-passive feed-back network, in which $\beta$ may be substantially greater than unity corresponding to a value of G which may approach zero, i. e., the output voltage is a small fraction of the input voltage and may be made negligible. The function of the modulating square wave C, in the present apparatus, is to reduce the value of $\beta$ from greater than unity to substantially zero for a time interval determined by the duration of the positive square wave, thereby restoring the value of G from substantially zero to substantially equal to A during this time interval.

The useful output of amplifier 13, Figure 1, is taken off the variable tap of potentiometer 41, Figure 2, and fed through blocking capacitor 54 to the control grid of amplifier tube 55, the output of which, derived in conventional manner from the anode thereof, is controlled by a second limiter-discriminator circuit comprising tubes 56 and 57; tube 56 providing diode clipping action to suppress negative peaks, and tube 57 constituting a clamp to short-circuit positive signals except when biased to cut-off or below. Tube 57 is actuated by square wave generator 15 which causes tube 57 to be biased to cut-off by a negative pulse illustrated by reference character D, to allow signal transmission as above described. Simultaneously, clamp tube 46 is biased to conductance by a positive pulse illustrated by reference character C to eliminate feed-back and permit signal transmission through amplifier 13, Figure 1.

Pulses not clamped by tube 57 pass through an additional amplifying stage provided by tube 58, the output of which is fed to each of two tubes 60 and 61 for the purpose of restoring the signals to their original height and positive sign. The output of tube 60 is fed to integral counter 17, Figure 1, which may be of conventional design, for example of the type employing a grid-controlled gaseous discharge tube so biased as to be actuated by all pulses larger than a predetermined value, the discharge tube in turn operating a message register to record the number of pulses per unit time.

The output of tube 61 is fed to differential counter 18, Figure 1, which may be of the type disclosed by A. Roberts, Rev. Sci. Inst., vol. XI, p. 44: 1940. In this type of counter a pair of grid-controlled gaseous discharge tubes are biased to potentials, the value of which may be altered without changing the difference therebetween. Pulses below a predetermined level will actuate neither tube, those above the first but below a second predetermined level will actuate only one tube, and those above the second level actuate both tubes. By employing a suitable output coupling circuit, a counter may be made to operate only in response to the firing of one of the two tubes, thus all pulses occurring within a definite range are counted.

Actuation of counter 18 in response to signals passing through the preceeding circuits after the start of the measuring cycle, due to the residual effects of neutrons traversing chamber 11 just prior to the start of the measuring cycle is prevented in the following manner. A biasing pulse is applied to counter 18 to hold it inoperative for a short interval after the measuring cycle starts, to confine counting by counter 18 to only those pulses due to neutrons traversing chamber 11 coincident with or following the start of the measuring cycle. This biasing pulse is obtained from post-discriminator square wave generator 19, Figure 1, which is similar to square wave generator 15.

Since both generators 15 and 19 may be of known type and are not claimed per se, detailed description of the circuits involved is avoided. The circuits may be of conventional multivibrator or flip-flop types, provision being made in a known manner for synchronization with the cyclotron pulses, and for variation of the timing and width of the generated square wave through conventional phase-shifting networks.

While the above apparatus comprises a preferred embodiment of the present invention, it will be readily apparent to persons skilled in the art that various modifications may be made to adapt the apparatus to various applications. For example, ionization chamber 11 may be modified to detect particles other than neutrons or may be replaced by other elements such as a phototube for the detection of radiant energy. If desired, the negative feed-back amplifier may be altered in a manner to apply the feed-back signal to the grid of the first amplifier tube instead of to the cathode thereof. Again, clamp tubes 46 and 57, Figure 2, may be replaced by mechanical switches or by a commutator device to perform the same functions. The signal fed to clamp tube 46 may have any of a variety of shapes other than the flat-topped pulse shown, if it is desired to modulate the feed-back circuit in other than an "on-off" fashion.

These and other modifications apparent to persons skilled in the art come within the spirit and scope of the present invention, the inventive aspects of which are defined with particularity in the following claims.

I claim:

1. An electronic recorder circuit for measuring the energy spectrum of fission neutrons produced by the bombardment of fissionable material by a primary burst of neutrons while preventing measurement of the energy of said primary neutrons, said circuit comprising a multi-stage electronic amplifier including input and output electron discharge devices associated in corresponding stages, each device including anode, cathode, and control element, means for introducing a signal on the control element of said first device, and means for varying the cathode potential of said first device in respect to the character of said introduced signal, said last mentioned means including a non-passive degenerative feed-back circuit interposed between the anode of said output stage device and the cathode of said input stage device, said feed-back circuit including a capacitor chargeable during feed-back through said degenerative circuit, means for rendering said feed-back circuit inoperative in response to an introduced control signal, and means for discharging said capacitor through a resistor series connected to the cathode of said input device pursuant to the rendering of said feed-back circuit inoperative, said resistor being of a value to control said capacitor discharge in a manner to simulate the character of the signal from said primary burst following termination of feed-back in said amplifier.

2. In a device of the character described, a multi-stage electronic amplifier including an input stage electron tube and an output stage electron tube each provided with cathode, anode, and control element, means for applying a signal on the control element of said input tube, a non-passive degenerative feed-back circuit including an input electron tube having cathode, anode, and control element, a shorting device responsive to an externally initiated control signal interposed between the cathode and anode of said last mentioned tube for periodically rendering the feed-back circuit inoperative, a second electron discharge device and a capacitor, series connected in the output of said feed-back circuit in a manner to effect charging of said capacitor by conduction of positive pulses through said second device, circuit means connecting the anode of said output stage amplifier tube to the control element of said feed-back circuit input tube, and means connecting the output of said feed-back circuit to the input tube of said amplifier, said last mentioned means including a series connected resistor between the cathode of said input amplifier tube and the capacitor of said feed-back output circuit, and means for introducing signals to said shorting device to render said feed-back circuit periodically inoperative.

3. In a device of the character described, the combination comprising a multi-stage electronic amplifier provided with input and output electron tubes, and a controllable feed-back circuit connecting said output tube to said input tube to periodically provide complete degenerative feed-back, said circuit including input and output networks, electronic amplifying means disposed therebetween, said output network including clamp means responsive to an introduced control signal for intermittently preventing signal transmission therethrough, means for shaping signals received from said input network including means for the elimination of negative pulse components, means for capacitively storing energy during periods of signal transmission, means for the release of said stored energy to said amplifier input tube during periods of non-transmission, and means for controlling the manner in which said stored energy is released.

4. An electronic recorder circuit having in combination, an electronic amplifier provided with an input stage and an output stage, circuit means for the establishment of degenerative feedback from said output stage to said input stage, a pulse shaping circuit electrically coupled to the output of said amplifier, said pulse shaping circuit including a split channel output, an integral counter electrically coupled to one of said split channels, a differential counter electrically connected to the other channel thereof, means for simultaneously rendering said pulse shaping circuit and said feed-back circuit alternately into a transmitting condition and a non-transmitting condition, the condition of one circuit being inverse to that of the other circuit, the output of said degenerative feed-back circuit being of a value to render said amplifier non-transmitting during feed-back, said counters being responsive to pulses of preselected magnitude introduced in said amplifier upon the simultaneous rendering of said feed-back circuit into a condition of non-transmitting and said pulse shaping circuit into a condition of transmitting.

5. In a device of the character described the combination with an amplifier, a feed-back circuit connected thereto, a differential counter, an integral counter, and a pulse shaping circuit electrically connected between said amplifier and said counters, of a pre-discriminator signal generator and a post discriminator signal generator, said pre-discriminator generator transmitting simultaneously signals of opposite character to said pulse shaping circuit and said feed-back circuit for the establishment of inverse states of transmission therein, said post discriminator being adapted to render said differential counter operative in time delay relation to the establishment of transmission in said pulse shaping circuit by said pre-discriminator circuit signal and to render said differential counter inoperative subsequent to said pulse shaping circuit being rendered into a condition of non-transmitting and prior to a succeeding pre-discriminator signal rendering said pulse shaping circuit again into a condition of transmitting.

6. Electronic apparatus having in combination, an ion chamber, a potential source associated therewith, an A. C. amplifier including input and output stages, means connecting said ion chamber to the input stage of said amplifier, a pulse shapping circuit having an input circuit and divided channel output circuits, means connecting said input circuit to said amplifier output stage, an integral counter and a differential counter connected individually to said output circuits, a degenerative feed-back circuit connected between the output and input stages of said amplifier, said feed-back circuit and said pulse shaping circuit each being provided with means responsive to introduced control signals for intermittent actuation between transmitting and non-transmitting conditions, and a signal generating circuit provided with a pair of output circuits connected to the actuating means of said feed-back circuit and said pulse shaping circuit respectively, said generator being adapted to simultaneously deliver control signals of opposite phase to said last mentioned circuits to instantaneously establish opposite conditions of signal transmission therein, said feed-back circuit being adapted to render said amplifier non-transmitting during periods of feed-back transmission, and transmitting during periods of feed-back elimination, whereby operation of said integral counter and said differential counter in response to signals initiated in said ion chamber is responsive to the control signals initiated by said generator.

7. In a device of the character described, the sub-combination comprising a degenerative feed-back circuit including an input tube having cathode, anode, and control element, said circuit including input and output networks, means for introducing a signal to said input network for amplification by said tube, clamp means disposed in said output network intermediate the cathode and anode of said tube and responsive to an introduced control signal for intermittently shorting said output network to prevent signal transmission therethrough, a pair of diodes disposed in said output network intermediate the cathode and anode of said input tube to provide suppression of negative signal components, a third diode and a capacitor in said output network series connected between cathode and the anode of said input tube, said output network having resistors in shunt therewith, and a fourth diode associated with said resistors in a manner to suppress negative output signals above a predetermined value, said circuit being adapted to provide controlled feed-back between the output and input stages of an A. C. electronic amplifier.

HANS H. STAUB.

REFERENCES CITED

The following references are of record in the file of this patent:

UNITED STATES PATENTS

| Number | Name | Date |
|---|---|---|
| 2,151,821 | Wilson | Mar. 28, 1939 |
| 2,156,060 | Muller | Apr. 25, 1939 |
| 2,156,061 | Muller | Apr. 25, 1939 |
| 2,208,665 | Crabtree | July 23, 1940 |
| 2,301,197 | Braddford | Nov. 10, 1942 |
| 2,332,300 | Cook | Oct. 19, 1943 |
| 2,366,583 | Williams | Jan. 2, 1945 |